(12) United States Patent
Khatri et al.

(10) Patent No.: US 12,307,232 B2
(45) Date of Patent: May 20, 2025

(54) GRANULAR LOCKDOWN OF OPERATING SYSTEM BASED FIRMWARE UPDATES

(71) Applicant: Dell Products L.P., Round Rock, TX (US)

(72) Inventors: Mukund P. Khatri, Austin, TX (US); William C. Munger, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 272 days.

(21) Appl. No.: 17/945,347

(22) Filed: Sep. 15, 2022

(65) Prior Publication Data

US 2024/0095009 A1    Mar. 21, 2024

(51) Int. Cl.
*G06F 9/44* (2018.01)
*G06F 8/65* (2018.01)

(52) U.S. Cl.
CPC ..................... *G06F 8/65* (2013.01)

(58) Field of Classification Search
None
See application file for complete search history.

(56) References Cited

U.S. PATENT DOCUMENTS

| | | | |
|---|---|---|---|
| 2017/0322796 A1* | 11/2017 | Kim | G06F 8/654 |
| 2019/0251297 A1* | 8/2019 | Khan | G06F 8/65 |
| 2019/0349752 A1* | 11/2019 | Fong | H04W 12/033 |
| 2020/0356357 A1* | 11/2020 | Narasimhan | G06F 8/654 |
| 2021/0048997 A1* | 2/2021 | Samuel | G06F 8/71 |
| 2022/0083324 A1 | 3/2022 | Singh et al. | |

\* cited by examiner

*Primary Examiner* — Qamrun Nahar
(74) *Attorney, Agent, or Firm* — Larson Newman, LLP (57) ABSTRACT

An information handling system includes a protected memory that stores identifiers of locked down devices. The system receives a firmware update package for a device within the information handling system. The firmware update package includes a firmware update for the device. The system determines whether an identifier for the device is located within protected memory. If the identifier for the device is located within the protected memory, then the system prevents the firmware update for the device.

16 Claims, 5 Drawing Sheets

GRANULAR LOCKDOWN OF OPERATING SYSTEM BASED FIRMWARE UPDATES

FIELD OF THE DISCLOSURE

The present disclosure generally relates to information handling systems, and more particularly relates to granular lockdown of operating system based firmware updates.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a protected memory that may store identifiers of locked down devices. A processor may receive a firmware update package for a device within the information handling system. The firmware update package includes a firmware update for the device. The processor may determine whether an identifier for the device is located within protected memory. In response to the identifier for the device being located within the protected memory, the processor may prevent the firmware update for the device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
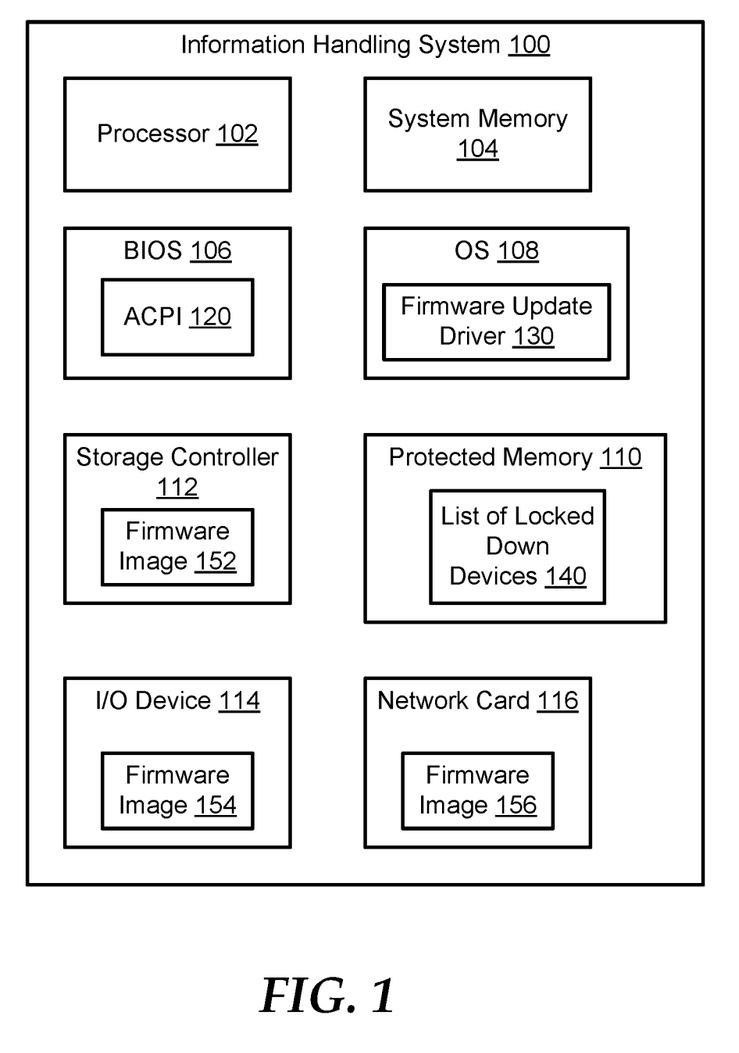
FIG. 1 is a diagram of a portion of an information handling system according to at least one embodiment of the present disclosure.

FIG. 1 illustrates a portion of an information handling system 100 according to an embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a processor 102, system memory 104, a basic input/output system (BIOS) 106, an operating system (OS) 108, a protected memory 110, and multiple other devices or components. The other devices or components include, but are not limited to, a storage controller 112, an input/output device 114, and a network card 116. BIOS 106 may include a memory to store any suitable data including, but not limited to, an advanced configuration and power interface (ACPI) table 120. OS 108 includes any suitable applications and drivers including, but not limited to, a firmware update driver 130. Protected memory 110 may be utilized to store any suitable data for information handling system 100, such as a list locked down devices 140. In certain examples, memory 110 may be considered protected because BIOS 106 authenticates and authorizes each entity that attempts to write to this memory, such that unauthenticated or unauthorized entities cannot write to the protected memory. Each of the devices in information handling system 100 may include individual firmware images. For example, storage controller 112 includes a firmware image 152, I/O device 114 includes a firmware image 154, and network card 116 includes a firmware image 156. Information handling system 100 may include additional components without varying from the scope of this disclosure.

During operation of information handling system 100, one or more firmware update capabilities may be available through OS 108 environment. In an example, firmware updates provided through OS 108 environment may be for each of the components within information handling system 100, such as storage controller 112, I/O device 114, and network card 116. In an example, OS 108 may communicate with portions of BIOS 106 that remain active after information handling system 100 has booted to the OS. For example, OS 108 may communicate with BIOS 106 to read ACPI table 120, to execute code that is available via an OS call to the ACPI table, or the like. In an example, a security vulnerability, security flaw, or attack vector may be exposed through the OS 108 environment firmware update capability. For example, an attacker may utilize the OS firmware update interface to inject malicious code or data into the firmware images of information handling system 100, such as firmware images 152, 154, and 156.

In previous information handling systems, firmware signing may be utilized as a layer of defense against attackers utilizing the firmware updates as potential attack vectors. However, firmware signing only provides a single layer of defense. Information handling system 100 may be improved by processor 102, BIOS 106, and OS 108 locking down specific devices, such as storage controller 112, I/O device 114, and network card 116, such that the associated firmware images, such as firmware images 152, 154, and 156, are not modified or updated via an OS firmware update interface.

During operation of information handling system 100, an administrator or other individual may provision the information handling system to lock down one or more devices so that firmware updates may not be performed on these devices. In an example, the lock down of the devices may be performed in any suitable manner during a BIOS boot process of information handling system 100. For example, a selection of one or more devices to disable firmware updates may be performed via one or more configuration consoles, such as a BIOS setup, a baseboard management controller (BMC) command, BMC graphical user interface (GUI), or the like.

In response to the selection of one or more devices being selected to lock down, these selections may be stored in protected memory 110. In an example, an identifier for a selected device may be stored in locked down device list 140. In certain examples, if an administrator selects storage controller 112, I/O device 114, and network card 116 as devices to lock down or disable firmware updates, a different identifier for each of the devices may be stored in protected memory 110. In an example, the identifier for a device may be any suitable identifier including, but not limited to a media access control (MAC) address and an I/O bus address.

In an example, the administrator or individual may need to provide authentication information prior to selecting one or more devices to lock. In an example, the administrator may also utilize the configuration consoles to unlock any previously locked devices. In this situation, the unlocked devices may have firmware updates enabled. In an example, information handling system 100 may be shipped with storage controller 112, I/O device 114, and network card 116 in any suitable firmware lock or unlock state. For example, an individual may place an order for information handling system 100 and within the order may request whether the information handling system be shipped with storage controller 112, I/O device 114, and network card 116 locked down or unlocked. If the individual requests one or more of storage controller 112, I/O device 114, and network card 116 to be shipped locked down, identifiers for these components may be stored in list of locked down devices 140 within protected memory 110 during the manufacturing of information handling system 100. In a situation with information handling system 100 being shipped with storage controller 112, I/O device 114, and network card 116 locked down, the individual may utilize configuration consoles to unlock particular devices within the information handling system.

During operation, one or more firmware update packages may be received at information handling system 100. The firmware update package may be associated with one of firmware images 152, 154, and 156. In response to the reception of a firmware update package, OS 108 may perform any suitable operations to determine whether a particular device is locked down with respect to firmware updates. For example OS 108 may call BIOS code associated with ACPI 120, the OS may execute firmware update driver 130, or the like.

In an example, runtime code of OS 108 may call BIOS code to perform the firmware update. In certain examples, the BIOS code may be executable by OS 108 to check the protected memory 110 for an identifier associated with the device for the firmware update. In an example, the BIOS code may be called in any suitable manner, such as via an 'updatecapsule' call. In certain examples, the BIOS code may be available and executable during the OS runtime. OS 108 may execute the BIOS code to perform one or more operations to provide a check to determine whether a device associated with the firmware update is locked down.

In certain examples, OS 108 may either scan list of locked down devices 140 or scan protected memory 110 for identifiers for the device. In the situation where OS 108 utilizes the BIOS code to scan protected memory 110, the BIOS code may create list of locked down devices 140 based on the device identifiers stored within the protected memory. In an example, list of locked down devices 140 may be created based on the device identifiers, and the list of locked down devices may be stored in protected memory 110.

Based on an identifier for the device associated with the firmware update being located within list of locked down devices 140, the BIOS code may prevent the firmware update from being performed. In this example, processor 102 may execute the BIOS code to prevent the firmware updates for the locked down devices during the BIOS update operations and before the firmware update is performed. In certain examples, processor 102 may prevent the firmware updates in any suitable manner. For example, the updates may be prevented by a firmware update option being greyed out so that it cannot be selected in an OS device manager. In these examples, if an identifier storage controller 112 is located within list of locked down devices 140, updates to firmware image 152 may be prevented in OS firmware update operations.

In an example, in response to the reception of a firmware update package, firmware update driver 130 of OS 108 may call ACPI 120. In an example, processor 102 may execute BIOS ACPI 120 to scan protected memory 110 for identifiers associated with locked down devices. Based on protected memory 110 being scanned, BIOS ACPI 120 may create list of locked down devices 140. In certain examples, list of locked down devices 140 may be created based on the device identifiers stored within protected memory 110.

In certain examples, list of locked down devices 140 may be provided to firmware update driver 130. In an example, firmware update driver 130 may provide list of locked down devices 140 to a user of information handling system 100 via a GUI on a display device, such as video display 534 of FIG. 5. If a firmware update is associated with a device, such as network card 116, in list of locked down devices 140, firmware update driver 130 may prevent the firmware updates to firmware image 156. However, the firmware update is associated with a device, such as I/O device 114, not located within list of locked down devices 140, firmware update driver 130 may allow the firmware updates to firmware image 154.

Figure 2:
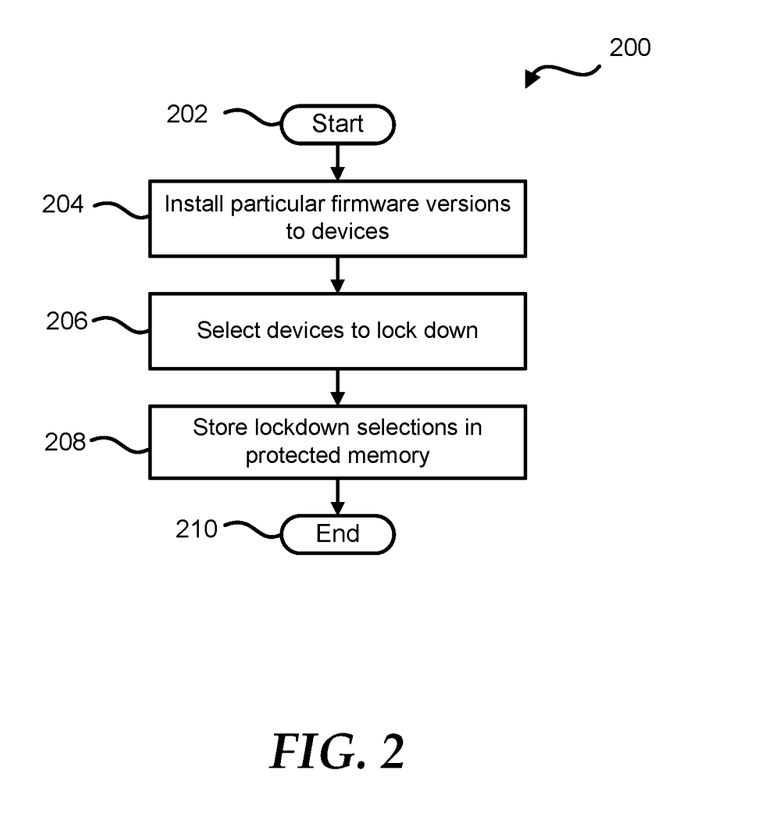
FIG. 2 is a flow diagram of a method for provisioning a list of locked down devices in an information handling system, according to at least one embodiment of the present disclosure.

FIG. 2 shows a method 200 for provisioning a list of locked down devices in an information handling system according to at least one embodiment of the present disclosure, starting at block 202. In an example, the method 200 may be performed by any suitable component including, but not limited to, a processor, such as processor 102 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 204, particular firmware versions are installed on devices of an information handling system. In an example, the devices may be any suitable device that has an individual firmware, such as a storage controller, an I/O device, a network cards, or the like. At block 206, devices to lock down are selected. In certain examples, an administrator or other individual may provision the information handling system to lock down one or more devices so that firmware updates may not be performed on these devices. In an example, the lock down of the devices may be performed in any suitable manner during a BIOS boot process of the information handling system. For example, a selection of one or more devices to disable firmware updates may be performed via one or more configuration consoles, such as a BIOS setup, a BMC command, BMC GUI, or the like.

At block 208, the lock down selections are stored in a protected memory, and the flow ends at block 210. In an example, an identifier for a selected device may be stored in the locked down device list. The protected memory may be any suitable type of memory such as a non-volatile random access memory.

Figure 3:
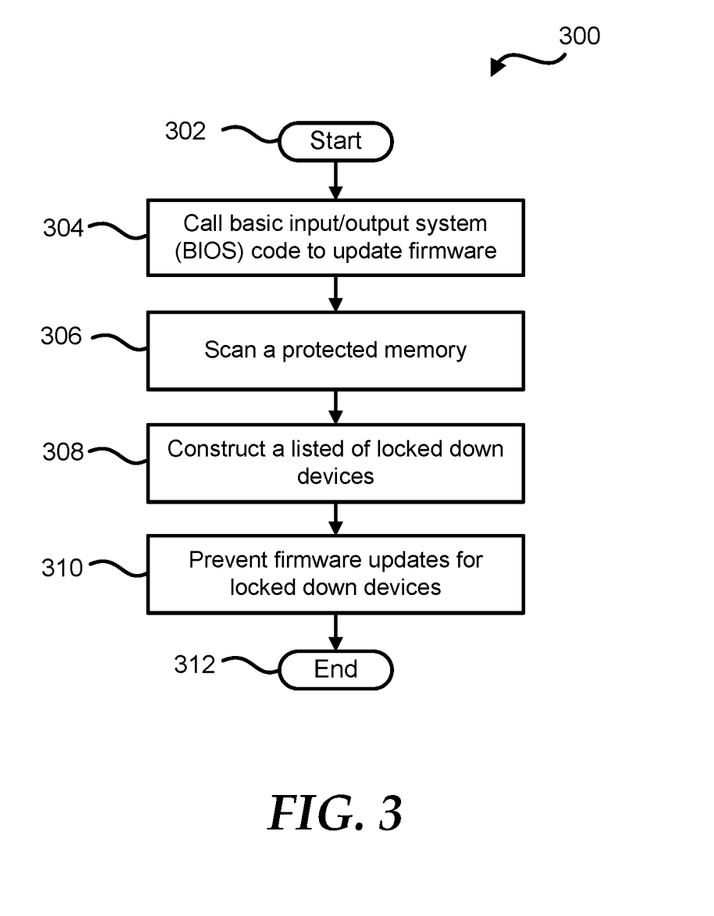
FIG. 3 is a flow diagram of a method for preventing a firmware update in a device based on a list of locked down devices, according to at least one embodiment of the present disclosure.

FIG. 3 shows a method 300 for preventing a firmware update in a device based on a list of locked down devices, according to at least one embodiment of the present disclosure, starting at block 302. In an example, the method 300 may be performed by any suitable component including a processor, such as processor 102 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 304, BIOS code is called to update firmware. In an example, the BIOS code may be called in any suitable manner, such as via an 'updatecapsule' call. In certain examples, the BIOS code may be available and executable during the OS runtime. The OS may execute the BIOS code to perform one or more operations to provide a check to determine whether a device associated with the firmware update is locked down.

At block 306, a protected memory is scanned. In an example, a processor may execute the BIOS code to scan the protected memory for identifiers associated with locked down devices. At block 308, a list of locked down devices is constructed. In certain examples, the list of locked down devices may be created based on the device identifiers stored within the protected memory. In an example, the list of locked down devices may be created based on the device identifiers, and the list of locked down devices may be stored in the protected memory.

At block 310, firmware updates are prevented for locked down devices, and the flow ends at block 312. In an example, the BIOS code may prevent the firmware updates for the locked down devices during the BIOS update operations and before the firmware update is performed. In certain examples, the BIOS code may prevent the firmware updates in any suitable manner. For example, the updates may be prevented by a firmware update option being greyed out so that it cannot be selected in an OS device manager.

Figure 4:
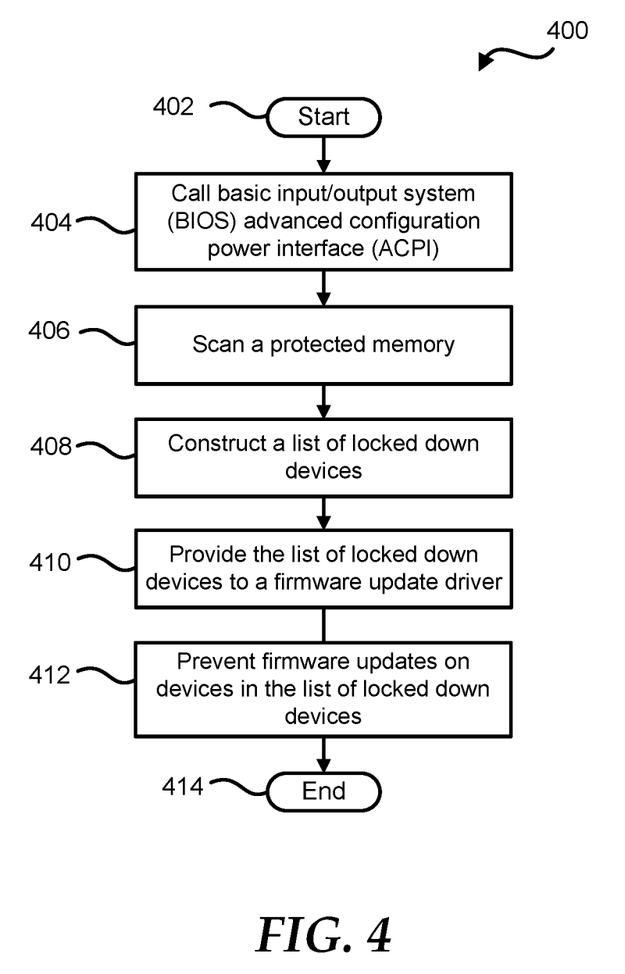
FIG. 4 is a flow diagram of another method for preventing a firmware update in a device based on a list of locked down devices, according to at least one embodiment of the present disclosure.

FIG. 4 is a flow diagram of another method for preventing a firmware update in a device based on a list of locked down devices, according to at least one embodiment of the present disclosure, starting at block 402. In an example, the method 300 may be performed by any suitable component including, but not limited to, a processor, such as processor 102 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 404, a BIOS ACPI method is called. In an example, a firmware update driver of the OS may call the BIOS ACPI method. At block 406, a protected memory is scanned. In an example, a processor may execute the BIOS ACPI method to scan the protected memory for identifiers associated with locked down devices.

At block 408, a list of locked down devices is constructed. In an example, the BIOS ACPI method may create the list of locked down devices. In an example, the list of locked down devices may be created based on the device identifiers, and the list of locked down devices may be stored in the protected memory.

At block 410, the list of locked down devices is provided to the firmware update driver. In an example, the firmware update driver may provide the list of locked down devices to a user of the information handling system via a GUI on a display device. At block 412, firmware updates are prevented on devices in the list of locked down devices, and the flow ends at block 414. In an example, the firmware update driver may prevent the firmware updates for the locked down devices during the update operations and before the firmware update is performed. In certain examples, the firmware update driver may prevent the firmware updates in any suitable manner. For example, the updates may be prevented by a firmware update option being greyed out so that it cannot be selected in an OS device manager.

Figure 5:
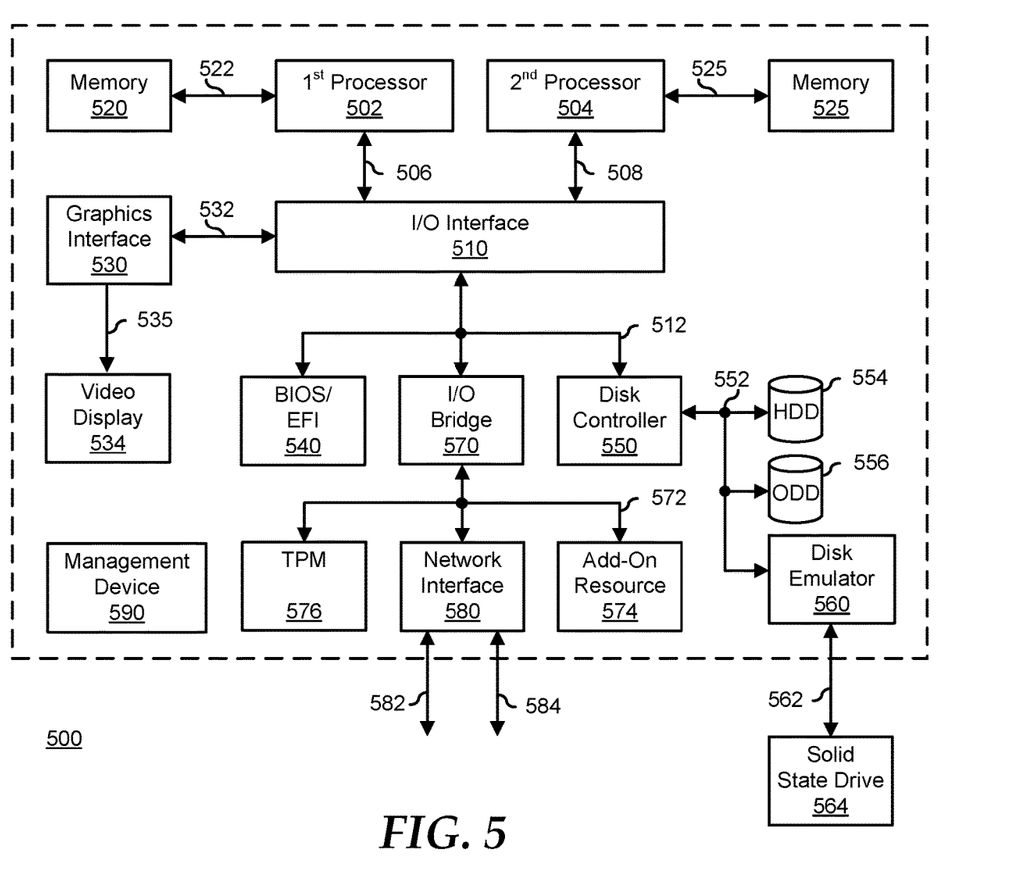
FIG. 5 is a block diagram of a general information handling system according to an embodiment of the present disclosure.

FIG. 5 shows a generalized embodiment of an information handling system 500 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, a management device 590, and a power supply 595. Processors 502 and 504, I/O interface 510, memory 520, graphics interface 530, BIOS/UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532 and provides a video display output 536 to a video display 534. In a particular embodiment, information handling system 500 includes separate memories that are dedicated to each of processors 502 and 504 via separate memory interfaces. An example of memories 520 and 530 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 4394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512 or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500.

Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:
   a protected memory to store identifiers of locked down devices; and
   a hardware processor to:
   receive a firmware update package for a device within the information handling system, wherein the firmware update package includes a firmware update for the device;
   call input/output system (BIOS) code, wherein the BIOS code to scan the identifiers of the locked down devices to create a list of locked down devices;
   determine whether an identifier for the device is located within the protected memory; and
   in response to the identifier for the device being located within the protected memory, the hardware processor further to prevent the firmware update for the device.

2. The information handling system of claim 1, further comprising a basic input/output system to:
   receive a selection of one or more devices to lockdown; and
   store identifiers for the selected devices within the protected memory.

3. The information handling system of claim 1, the hardware processor further to utilize the BIOS code to perform the prevention of the firmware update for the device.

4. The information handling system of claim 1, wherein in response to the identifier for the device being located within the protected memory, the hardware processor further to indicate one or more locked down devices to an individual associated with the information handling system.

5. The information handling system of claim 4, wherein the indication of the locked down devices includes firmware update options for the locked down device being unselectable in a graphical user interface.

6. The information handling system of claim 1, wherein in response to the identifier for the device not being located within the protected memory, the hardware processor further to allow the firmware update for the device.

7. The information handling system of claim 1, wherein the identifiers of locked down devices are stored in the protected memory during a manufacturing process of the information handling system.

8. A method comprising:
   receiving, by a hardware processor of an information handling system, a firmware update package for a device within the information handling system, wherein the firmware update package includes a firmware update for the device;
   calling input/output system (BIOS) code, wherein the BIOS code to scan identifiers of locked down devices to create a list of locked down devices;
   determining whether an identifier for the device is located within a protected memory of the information handling system, wherein the protected memory is configured to store identifiers of locked down devices; and
   in response to the identifier for the device being located within the protected memory, preventing, by the hardware processor, the firmware update for the device, wherein firmware update options for the locked down device are un-selectable in a graphical user interface.

9. The method of claim 8, further comprising:
   receiving, by a basic input/output system, a selection of one or more devices to lockdown; and
   storing identifiers for the selected devices within the protected memory.

10. The method of claim 8, further comprising utilizing the BIOS code to perform the prevention of the firmware update for the device.

11. The method of claim 8, wherein in response to the identifier for the device being located within the protected memory, the method further comprises indicating one or more locked down devices to an individual associated with the information handling system.

12. The method of claim 8, wherein in response to the identifier for the device not being located within the protected memory, the method further comprises allowing the firmware update for the device.

13. An information handling system comprising:
   a protected memory to store identifiers of locked down devices;
   a basic input/output system (BIOS) to:
      receive a selection of one or more devices to lockdown; and
      store identifiers for the selected devices within the protected memory; and
   a hardware processor to:
      receive a firmware update package for a device within the information handling system, wherein the firmware update package includes a firmware update for the device;
      call BIOS code, wherein the BIOS code to scan the identifiers of the locked down devices to create a list of locked down devices;
      determine whether an identifier for the device is located within the protected memory;
      if the identifier for the device is located within the protected memory, the hardware processor further to prevent the firmware update for the device; and
      else the hardware processor to allow the firmware update for the device.

14. The information handling system of claim 13, wherein the hardware processor further to utilize the BIOS code to perform the prevention of the firmware update for the device.

15. The information handling system of claim 13, wherein in response to the identifier for the device being located within the protected memory, the hardware processor further to indicate one or more locked down devices to an individual associated with the information handling system.

16. The information handling system of claim 13, wherein the indication of the locked down devices includes firmware update options for the locked down device being unselectable in a graphical user interface.

* * * * *